(12) United States Patent
Battaglia et al.

(10) Patent No.: US 9,384,220 B2
(45) Date of Patent: Jul. 5, 2016

(54) OPTIMIZING DATABASE DEFINITIONS FOR A NEW DATABASE

(71) Applicant: International Business Machines Corporation, Armonk, NY (US)

(72) Inventors: Michael Battaglia, Lagrangeville, NY (US); Heather A. Smith, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 14/227,780

(22) Filed: Mar. 27, 2014

(65) Prior Publication Data

US 2015/0278255 A1    Oct. 1, 2015

(51) Int. Cl.
*G06F 17/30* (2006.01)
(52) U.S. Cl.
CPC ................ *G06F 17/30289* (2013.01)
(58) Field of Classification Search
CPC combination set(s) only.
See application file for complete search history.

(56) References Cited

U.S. PATENT DOCUMENTS

| | | | | |
|---|---|---|---|---|
| 5,481,649 | A * | 1/1996 | Birdwell | G05B 13/028 700/49 |
| 2008/0066052 | A1* | 3/2008 | Wolfram | G06F 8/30 717/109 |
| 2008/0071730 | A1 | 3/2008 | Barcia et al. | |
| 2011/0029569 | A1* | 2/2011 | Ganesh | G06F 17/30595 707/796 |
| 2011/0106812 | A1 | 5/2011 | Hammerschmidt et al. | |

FOREIGN PATENT DOCUMENTS

| | | |
|---|---|---|
| EP | 0723239 A1 | 7/1996 |
| GB | 2253500 A | 9/1992 |

OTHER PUBLICATIONS

J. Miszczyk et al., "DB2 UDB for AS/400 Object Relational Support," IBM Corporation, http://www.ibm.com/redbooks/sg24-5409-00 . . . , Feb. 2000, 256 pages.

Disclosed Anonymously, "Method for Handling Long Running Sequences of Operations on Relational Database," ip.com, IPCOM000221306D, Sep. 2012, 16 pages.

Wikipedia, "Database index," http://en.wikipedia.org/wiki/Database_index, Mar. 4, 2014, 6 pages.

Wikipedia, "Data definition language," http://en.wikipedia.org/wiki/Data_definition_language, Mar. 4, 2014, 4 pages.

Wikipedia, "Tablespace," http://en.wikipedia.org/wiki/Tablespace, Mar. 4, 2014, 1 page.

Wikipedia, "Table (database)," http://en.wikipedia.org/wiki/Table_(database), Mar. 4, 2014, 2 pages.

Wikipedia, "Data Definition Language (DDL)," http://whatis.techtarget.com/definition/Data-Definition-Language-DDL, Mar. 4, 2014, 1 page.

* cited by examiner

*Primary Examiner* — Etienne Leroux
(74) *Attorney, Agent, or Firm* — Jeff Tang; Ryan, Mason & Lewis, LLP

(57) ABSTRACT

Systems and methods for optimizing a definition for a database are provided. A method for optimizing a definition for a database, comprises receiving an input command to create a database object, receiving at least one extension corresponding to an estimated feature of the database, submitting the input command and the at least one extension to a knowledge base to determine an optimized command, and generating the optimized command.

17 Claims, 3 Drawing Sheets

OPTIMIZING DATABASE DEFINITIONS FOR A NEW DATABASE

TECHNICAL FIELD

The field generally relates to systems and methods for optimizing a definition for a database and, in particular, systems and methods for automating the optimization of database definitions for new databases.

BACKGROUND

Creating a database, such as a relational database, can be a complicated process. To develop optimal definitions for a relational database, known methods require a significant amount of understanding of the database being used, and of the data that will populate the database. For example, a Database Administrator (DBA) may spend years becoming an expert in their field to eventually understand and follow all of the nuances that deliver the best performance for a database.

Beyond the role of a DBA, other database builders may not have an understanding of how to take advantage of their chosen product(s) and create optimal definitions for the database. Without proper definitions, such as definitions for the schema, a database may suffer from performance problems and unwanted overhead which consume, for example, central processing unit (CPU), Memory, and/or Disk Input/Output (I/O) resources. This could lead to service level agreements (SLAs) being missed due to unsatisfactory performance and outages.

Known solutions to fix relational database performance require a great deal of effort on the part of a DBA to analyze the existing schema, get additional input from the database owner, and write new Data Definition Language (DDL) statements or commands. Depending on the scope of the database, the time and money spent optimizing the database for acceptable performance may be significant.

Accordingly, there is a need for systems and methods which automate the optimization of database definitions for databases.

SUMMARY

In general, exemplary embodiments of the invention include systems and methods for optimizing a definition for a database and, in particular, systems and methods for automating the optimization of database definitions for new databases.

According to an exemplary embodiment of the present invention, a system for optimizing a definition for a database, comprises an input module capable of receiving an input command to create a database object, and receiving at least one extension corresponding to an estimated feature of the database, and an optimization module comprising a knowledge base capable of receiving the input command and the at least one extension from the input module, determining an optimized command, and generating the optimized command.

According to an exemplary embodiment of the present invention, a method for optimizing a definition for a database, comprises receiving an input command to create a database object, receiving at least one extension corresponding to an estimated feature of the database, submitting the input command and the at least one extension to a knowledge base to determine an optimized command, and generating the optimized command.

According to an exemplary embodiment of the present invention, a computer program product for optimizing a definition for a database comprises a computer readable storage medium having program instructions embodied therewith, the program instructions executable by a processor to cause the processor to perform a method comprising receiving an input command to create a database object, receiving at least one extension corresponding to an estimated feature of the database, submitting the input command and the at least one extension to a knowledge base to determine an optimized command, and generating the optimized command.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which.

DETAILED DESCRIPTION OF EXEMPLARY EMBODIMENTS

Figure 1:
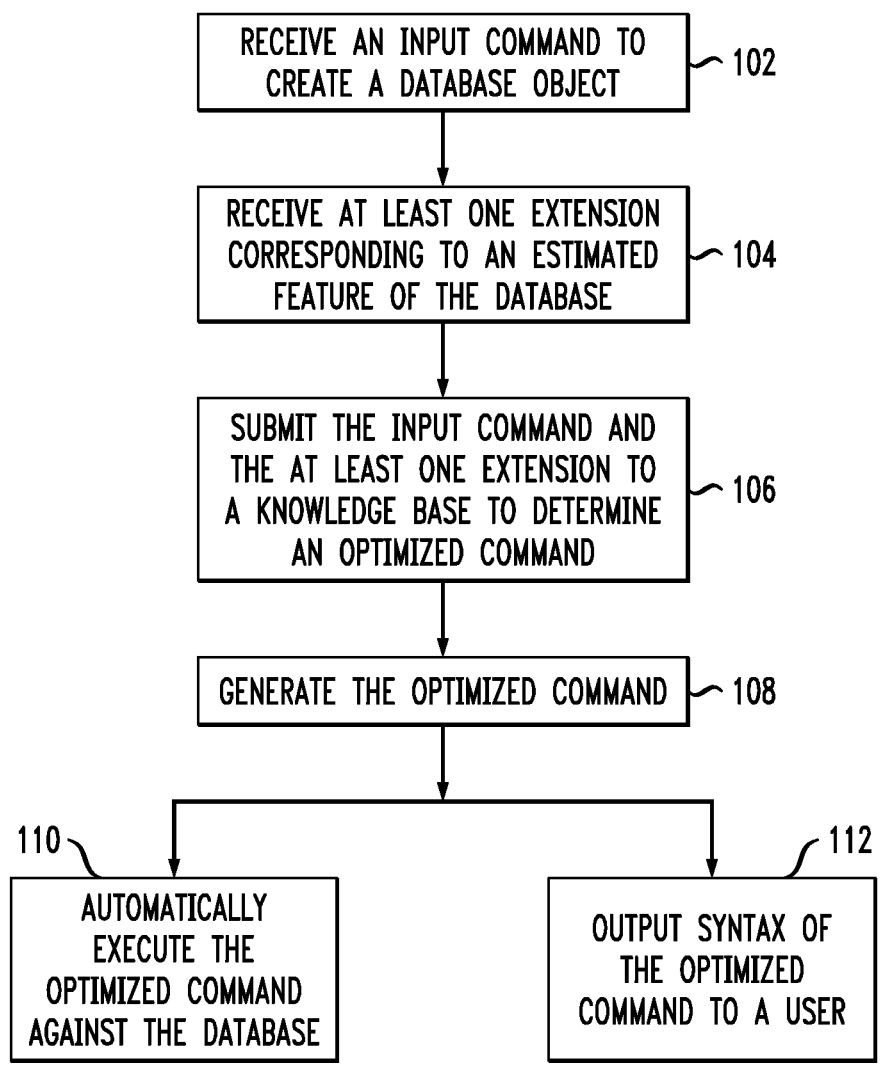
FIG. 1 is a flow diagram of a method for optimizing a definition for a database, according to an exemplary embodiment of the invention.

Exemplary embodiments of the invention will now be discussed in further detail with regard to systems and methods for optimizing a definition for a database and, in particular, to systems and methods that automate the optimization of database definitions for new databases. This invention may, however, be embodied in many different forms and should not be construed as limited to the embodiments set forth herein.

As new database software versions and/or fix packs are released, a DBA must continually keep abreast of this information and make correct decisions about database definitions. Depending on a DBA's level of expertise, such attempts could become a continuous loop of trial and error until the DDL is perfected.

Embodiments of the present invention include systems and methods that automate the optimization of database definitions for new databases, thereby saving time and resources, and increasing a DBA's productivity. Embodiments of the present invention may also result in a broadening of the spectrum of information technology (IT) professionals who are capable of creating optimized database definitions.

As used herein a "database definition" can refer to a defining characteristic or feature of a database object. A database definition can be present as a command or plurality of commands as part of DDL (see definition of DDL below).

As used herein, a "database object" can include, but is not limited to, schema, tables, tablespace, row assignments, column assignments, relationships between tables, keys, indexes, views, triggers, aliases, data types, sequences, database partition groups, buffer pools and/or procedures and queries for reading and writing information.

As used herein a "table" can refer to an organized set of data elements (e.g., values) using a model of vertical columns (which are identified by their name) and horizontal rows, with a cell being a unit where a row and column intersect.

As used herein, a "relational database" can refer to a database that has a collection of tables of data items described and organized according to a relational model. Data in a single table can represent a relation. It is to be understood that embodiments of the present invention are not necessarily limited to relational databases, and may apply to structures making up a database, such as, for example, indexes (e.g., DB2®, Oracle®, MS SQL Server, Sybase®), and to other types of databases, such as, for example, hierarchical (e.g., IMS®), network (based on a neural network model), and NoSQL (based on models, JSON™ and open source, e.g., column family, Hbase, Mongo®, Cassandra). As used herein an "index" of a database can refer to a data structure that improves the speed of data retrieval operations on a database table. Indexes can be used to quickly locate data without having to search every row in a database table every time a database table is accessed. An index can be a copy of one or more columns of data from a database table that can be efficiently searched.

As used herein "tablespace" can refer to a database storage location where data underlying database objects can be kept. A tablespace can be referred to by name when creating database segments (e.g., database objects which occupy physical space, such as table data and indexes).

As used herein "Data Definition Language" or "DDL" can refer to syntax for defining data structures. DDL can be used for commands that define different structures in a database to establish database definitions. For example, DDL statements or DDL commands can create, modify, and remove database objects. DDL statements may include, for example, CREATE, ALTER, and DROP.

As used herein, "extensions" or "extensions to the DDL" can refer to additions to the DDL which correspond to parameters provided by a database creator that address table and column behavior. The parameters can include, but are not limited to, estimates of how often a column is updated, the size of the data type, the average length of the column in practice, and/or the domain of values and value ranges. Extensions can specify, for example a type (e.g., update frequency of a column), a value (e.g., 8 updates/hour), and any conditions (e.g., updating only occurs after specific event).

Embodiments of the present invention can be used to create database definitions, such as, for example, tablespace, table, and/or index definitions using, for example, optimal configuration and column ordering to enable efficient database utilization and performance.

Typically, an optimal database definition created by a DBA is based on a significant amount of experience and data knowledge, as well as an understanding of underlying relational models and storage engines of a product. Those that are not DBAs may have no knowledge of these underlying factors and, as a result, create databases that consume more resources and are less likely to be as efficient as those a DBA would define. In today's fast paced development cycle, DBA resources may not always be readily available to developers. The embodiments of the present invention aim to reduce perfunctory DBA tasks, saving time and resources, and increasing productivity. The embodiments of the present invention further aim to reduce or eliminate the time required to concentrate on database definition details.

Referring to FIG. 1, a flow diagram of a method for optimizing a definition for a database, according to an embodiment of the present invention, is shown. The method 100 is an estimate approach that can be used when a database has no existing objects. The method includes receiving an input command to create a database object (block 102), receiving at least one extension corresponding to an estimated feature of the database (block 104), submitting the input command and the at least one extension to a knowledge base to determine an optimized command (block 106), and generating the optimized command (block 108).

In accordance with an embodiment of the present invention, the input and optimized commands each comprise one or more DDL statements. A plurality of input commands and extensions can be generated by a user and included in DDL. The estimated features of the database which correspond to the extensions include, but are not limited to, values specifying usage estimates, growth estimates and size estimates. More specifically, an estimated feature of the database can include, for example, an update frequency of a column, an update frequency of a row, a number of reads, a number of creates, a size of a data type, an average size of a column, an average size of a row, the domain of values, value ranges, and/or a growth rate of a table. Average sizes can include, for example, an average row size of a variable character field (varchar), blog, and/or extensible markup language (XML) columns.

If the input command is not already optimal, the optimized command is generated by altering the input command. The method 100 can further comprise automatically executing the optimized command against the database (block 110), and/or outputting syntax of the optimized command to a user (block 112). The optimized command can result in, for example, reordering table columns, adding an index and/or resizing database tablespace.

In accordance with an embodiment of the present invention, the method 100 utilizes extensions in the DDL, which are parameters provided by a database creator that are used when a database has no existing objects. In accordance with an embodiment of the present invention, extensions are made to the DDL to accept these optional parameters that address table and column behavior to optimize the input commands. The existence of these new parameters will signal a database engine to submit the extensions and input commands to a knowledge base. According to an embodiment, the knowledge base returns an optimized DDL and an alter database command if necessary (e.g., when the input command or DDL is not already optimal). As noted above with respect to block 110, optimized DDL files can be executed against the database. As noted above, possible alterations to a DDL can result in reordering table columns, adding indexes and/or resizing the database tablespace.

Figure 2:
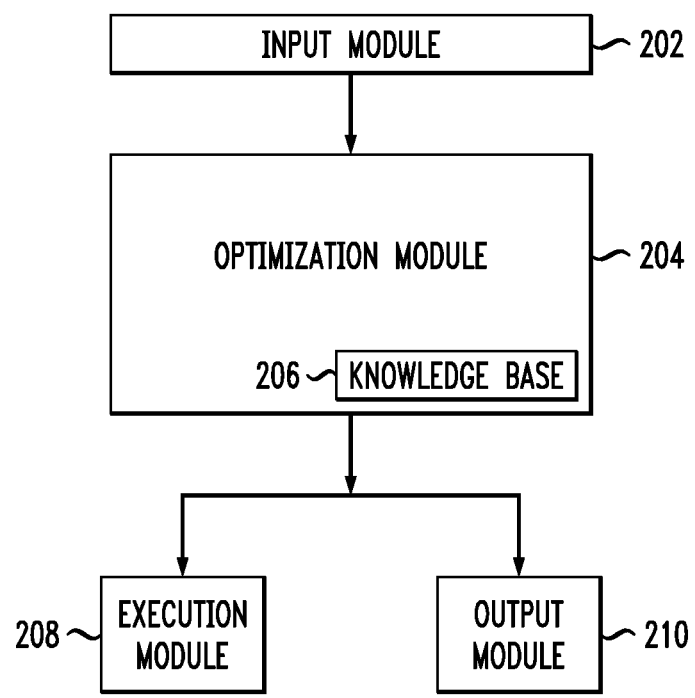
FIG. 2 is high-level diagram showing detail of a system for optimizing a definition for a database, according to an exemplary embodiment of the invention.

Referring to FIG. 2, which is a high-level diagram of a system 200 for optimizing a definition for a database, according to an embodiment of the present invention, the system includes an input module 202 capable of receiving an input command to create a database object, and receiving at least one extension corresponding to an estimated feature of the database, and an optimization module 204 connected to the input module 202. The optimization module 204 includes a knowledge base 206 capable of receiving the input command and the at least one extension from the input module 202, determining an optimized command, and generating the optimized command.

The system can further include an execution module 208 capable of automatically executing the optimized command against the database, and an output module 210 capable of outputting syntax of the optimized command to a user.

In accordance with an embodiment of the present invention, the knowledge base 206 includes an internal repository of decision trees and quantifiable information about database objects through which the input commands and extensions are processed to permit the knowledge base 206 to generate, for example, optimized create and alter commands. The knowledge base 206 can be extended for each database software release to embody the necessary extensions to reflect improvements in the database engine that may be derived via the methods of the embodiments of the present invention.

In accordance with an embodiment of the present invention, the knowledge base 206 may be figuratively viewed as a "black box." The knowledge base 206 can be designed by the same team that develops software for a given database that is being optimized. The knowledge base 206 can, for example, work for DB2® and other types of database products. According to embodiments of the present invention, the knowledge base 206 may contain the actual size of each type of column, logic that would accept the additional input parameters from the DDL and process the parameters. In accordance with an embodiment, decision trees in a knowledge base can process each parameter for each object and output new DDL statements. The output of the knowledge base can result in actions such as, for example, reordering columns in a table, putting tables in different table spaces and adding indexes to a database. The outputs can be different for each type of database product. Different inputs could be added that would result in different types of resulting actions.

In accordance with an embodiment of the present invention, a database creator creates object definition syntax, and adds options (extensions), which are processed by the knowledge base 206 to determine and generate the optimized object definitions. In a specific example, a database creator may submit via the input module 202, a "Create Table" object including extensions to the DDL for a column object. The extensions for a column object can include, for example, estimated parameters and descriptions, such as number and time units (e.g., 8 times/hour) in connection with column update frequency, number and size units (e.g., 4 million cells) in connection with column length, and an interval in connection with a column value range. Additional column behavior attribute extensions can also be submitted. The "Create Table" object and extensions to the DDL for a column object are processed by the knowledge base 206 to determine and generate the optimized column object definitions, which can then be presented to the database creator in the form new syntax, or automatically executed against a database.

In accordance with embodiments of the present invention, descriptions of how the DDL could be changed are set forth below. Two applicable types of objects that could be extended with additional properties to the DDL are addressed below as they relate to DB2®. However, it is to be understood that embodiments of the present invention are not necessarily limited thereto, and other types of objects could be altered with additional properties. The two object types are columns and tables, and properties added to the DDL language are optional.

```
COLUMN PROPERTIES SYNTAX
create table TABLE_NAME (COLUMN_NAME INTEGER
{
column_average_update (#, TIME_UNIT),
column_sum_update (#, TIME_UNIT),
column_min_update (#, TIME_UNIT),
column_max_update (#, TIME_UNIT),
column_average_read (#,TIME_UNIT),
column_sum_read (#, TIME_UNIT),
column_min_read (#, TIME_UNIT),
column_max_read (#, TIME_UNIT),
column_average_insert (#, TIME_UNIT),
column_sum_insert (#, TIME_UNIT),
```

-continued

```
column_min_insert (#, TIME_UNIT),
column_max_insert (#, TIME_UNIT),
column_average_size (#, SIZE_UNIT),
column_value_range (NUMBER_RANGE OR VALUE_RANGE),
column_predicate_usage (%, #),
column_data_patterns (SORT_ORDER)
},
...
)
        TABLE PROPERTY SYNTAX
create table TABLE_NAME (COLUMN_NAME INTEGER,
...
)
TABLE_GROWTH_PATTERN (#,TIME_UNIT),
TABLE_DELETE_PATTERN (#,TIME_UNIT)
```

In accordance with embodiments of the present invention, the following parameter descriptions may apply. TIME_UNIT can refer to, for example, daily, weekly, monthly, yearly, hourly, per minute, per second, etc. SIZE_UNIT can refer to, for example, Byte (B), kilo-byte (KB), mega-byte (MB), giga-byte (GB), tera-byte (TB), etc. SORT_ORDER can refer to, for example, ascending (asc), descending (desc), random. NUMBER_RANGE can refer to, for example, # . . . #, e.g.: 1 . . . 1000. VALUE_RANGE can refer to, for example, varchar, varchar, varchar, e.g.: Cat, Dog, Gerbil.

```
        COLUMN PROPERTY EXAMPLE
create table TABLE_NAME (COLUMN_NAME INTEGER
{
column_average_update ( 100, daily),
column_sum_update (200, daily),
column_min_update (10, daily),
column_max_update (500, daily),
column_average_read (1000 ,daily),
column_sum_read (800, daily),
column_min_read (400, daily),
column_max_read (2000, daily),
column_average_insert (100, daily),
column_sum_insert (200, daily),
column_min_insert (50, daily),
column_max_insert (500, daily),
column_average_size (5, KB),
column_value_range (1...1000),
column_predicate_usage (100%,10),
column_data_patterns (asc)
},
...
)
        TABLE PROPERTY EXAMPLE
create table TABLE_NAME (COLUMN_NAME_INTEGER,
...
)
TABLE_GROWTH_PATTERN (500, monthly),
TABLE_DELETE_PATTERN (100,weekly)
```

As used herein, "column_average_update (#, TIME_UNIT)" refers to the expected average number of updates to be made within the provided time unit.

As used herein, "column_sum_update (#, TIME_UNIT)" refers to the expected summation of updates to be made within the provided time unit.

As used herein, "column_min_update (#, TIME_UNIT)" refers to the expected minimum number of updates to be made within the provided time unit.

As used herein, "column_max_update (#, TIME_UNIT)" refers to the expected maximum number of updates to be made within the provided time unit.

As used herein, "column_average_read (#, TIME_UNIT)" refers to the expected average number of reads to be made within the provided time unit.

As used herein, "column_sum_read (#, TIME_UNIT)" refers to the expected summation of reads to be made within the provided time unit.

As used herein, "column_min_read (#, TIME_UNIT)" refers to the expected minimum number of reads to be made within the provided time unit.

As used herein, "column_max_read (#, TIME_UNIT)" refers to the expected maximum number of reads to be made within the provided time unit.

As used herein, "column_average_insert (#, TIME_UNIT)" refers to the expected average number of inserts to be made within the provided time unit.

As used herein, "column_sum_insert (#, TIME_UNIT)" refers to the expected summation of inserts to be made within the provided time unit.

As used herein, "column_min_insert (#, TIME_UNIT)" refers to the expected minimum number of inserts to be made within the provided time unit.

As used herein, "column_max_insert (#, TIME_UNIT)" refers to the expected maximum number of inserts to be made within the provided time unit.

As used herein, "column_average_size (#, SIZE_UNIT)" refers to the average actual column size and the related size unit.

As used herein, "column_value_range (NUMBER_RANGE OR VALUE_RANGE)" refers to the range or list of values expected for a given column.

As used herein, with respect to "column_predicate_usage (FREQUENCY, RANKING)", the FREQUENCY refers to a percentage value that indicates the frequency with which this column will be used in a "where" clause for statements. For example, 100% means the column will be used in the "where" clause for every applicable statement that is executed on the related table. The RANKING value refers to a number that indicates the importance of the column in the statement to the application. Allowable values are, for example, 0 through 10, where 0 means the column is not being ranked. If the RANKING parameter is not used for a given column, 0 can be the default assumption. 10 can mean that the column is, the most important part of the overall statement of the columns that were ranked. 1 can mean that the column is the least important of the other columns that were ranked.

As used herein, with respect to "column_data_patterns (SORT_ORDER)," the SORT_ORDER value can be, for example, ascending (asc), descending (desc) or random. It indicates the order in which the values are sorted if the values will be inserted into one of these patterns. Can be used for any type of field, but is best applied to a column of type date or timestamp.

As used herein, "TABLE_GROWTH_PATTERN (#, TIME_UNIT)" can refer to the number of rows that will be added to a table during the provided time unit.

As used herein, "TABLE_DELETE_PATTERN (#, TIME_ UNIT)" can refer to the number of rows that will be deleted from a given table during the provided time unit.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
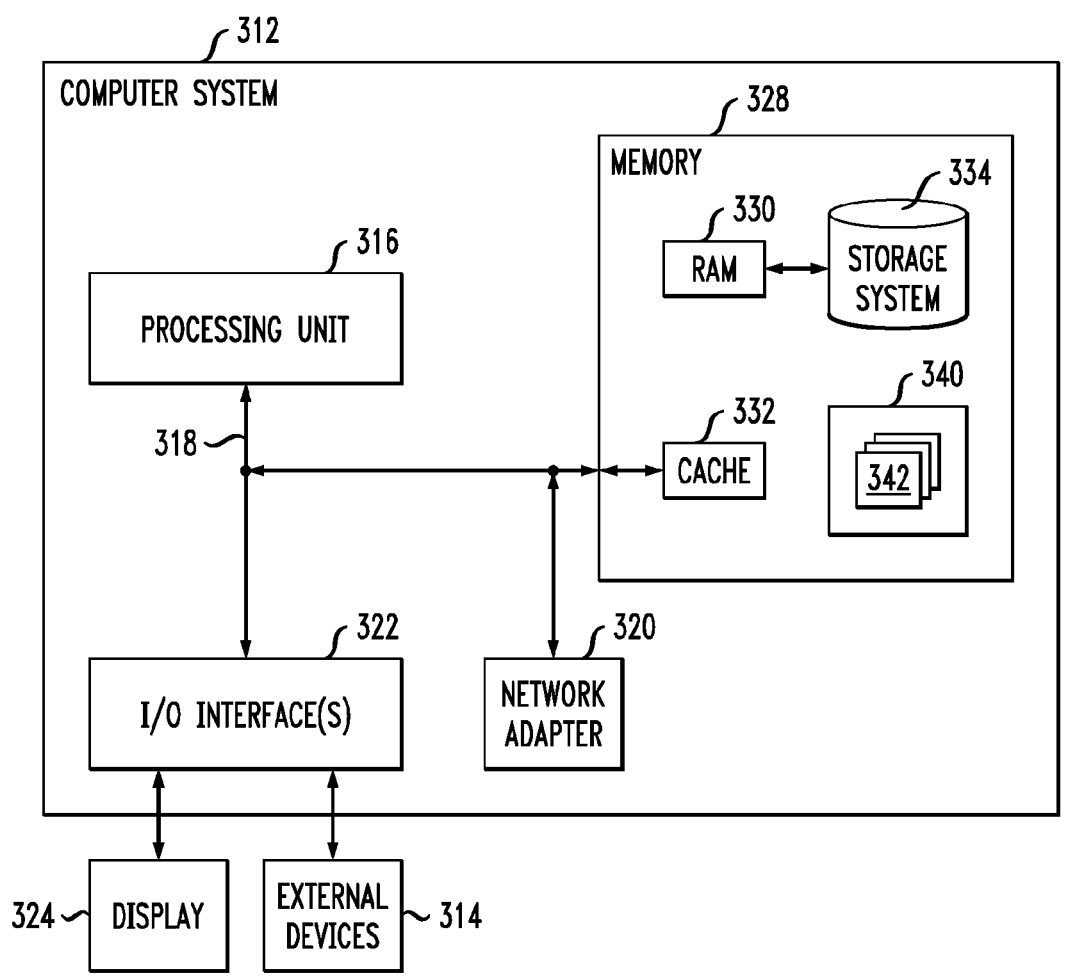
FIG. 3 illustrates a computer system in accordance with which one or more components/steps of the techniques of the invention may be implemented, according to an exemplary embodiment of the invention.

One or more embodiments can make use of software running on a general-purpose computer or workstation. With reference to FIG. 3, in a computing node 310 there is a computer system/server 312, which is operational with numerous other general purpose or special purpose computing system environments or configurations. Examples of well-known computing systems, environments, and/or configurations that may be suitable for use with computer system/server 312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 312 may be described in the general context of computer system executable instructions, such as program modules, being executed by a computer system. Generally, program modules may include routines, programs, objects, components, logic, data structures, and so on that perform particular tasks or implement particular abstract data types. Computer system/server 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 312 in computing node 310 is shown in the form of a general-purpose computing device. The components of computer system/server 312 may include, but are not limited to, one or more processors or processing units 316, a system memory 328, and a bus 318 that couples various system components including system memory 328 to processor 316.

The bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 312 typically includes a variety of computer system readable media. Such media may be any available media that is accessible by computer system/server 312, and it includes both volatile and non-volatile media, removable and non-removable media.

The system memory 328 can include computer system readable media in the form of volatile memory, such as random access memory (RAM) 330 and/or cache memory 332. The computer system/server 312 may further include other removable/non-removable, volatile/nonvolatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 318 by one or more data media interfaces. As depicted and described herein, the memory 328 may include at least one program product having a set (e.g., at least one) of program modules that are configured to carry out the functions of embodiments of the invention. A program/utility 340, having a set (at least one) of program modules 342, may be stored in memory 328 by way of example, and not limitation, as well as an operating system, one or more application programs, other program modules, and program data. Each of the operating system, one or more application programs, other program modules; and program data or some combination thereof, may include an implementation of a networking environment. Program modules 342 generally carry out the functions and/or methodologies of embodiments of the invention as described herein.

Computer system/server 312 may also communicate with one or more external devices 314 such as a keyboard, a pointing device, a display 324, etc., one or more devices that enable a user to interact with computer system/server 312, and/or any devices (e.g., network card, modem, etc.) that enable computer system/server 312 to communicate with one or more other computing devices. Such communication can occur via Input/Output (I/O) interfaces 322. Still yet, computer system/server 312 can communicate with one or more networks such as a local area network (LAN), a general wide area network (WAN), and/or a public network (e.g., the Internet) via network adapter 320. As depicted, network adapter 320 communicates with the other components of computer system/server 312 via bus 318. It should be understood that although not shown, other hardware and/or software components could be used in conjunction with computer system/server 312. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A system for optimizing a definition for a database, comprising:
   an input module capable of receiving an input command to create a database object, and receiving at least one extension corresponding to an estimated feature of the database; and
   an optimization module comprising a knowledge base;
   wherein the knowledge base includes design information corresponding to how a database software product processes and stores information in the database;
   wherein the knowledge base is capable of:
   receiving the input command and the at least one extension from the input module;
   automatically determining that the input command is not optimal for use with the database software product;
   automatically determining an optimized command for use with the database software product; and
   automatically generating the optimized command by altering the input command;
   wherein the input and optimized command each comprise one or more data definition language (DDL) statements; and
   wherein the optimized command alters the input command to result in one or more modifications to a DDL statement to conform the DDL statement to the database software product associated with the knowledge base.

2. The system according to claim 1, wherein the at least one extension is included in data definition language (DDL).

3. The system according to claim 1, wherein the estimated feature of the database includes at least one of a usage estimate, a growth estimate and a size estimate.

4. The system according to claim 1, wherein the estimated feature of the database includes at least one of an update frequency of a column, an update frequency of a row, a size of a data type, an average size of a column, an average size of a row and a growth rate of a table.

5. The system according to claim 1, further comprising an execution module capable of automatically executing the optimized command against the database.

6. The system according to claim 1, further comprising an output module capable of outputting syntax of the optimized command to a user.

7. The system according to claim 1, wherein the knowledge base comprises a repository of decision trees and information about database objects to generate optimized create and alter commands.

8. The system according to claim 1, wherein the optimized command results in at least one of reordering table columns, adding an index and resizing database tablespace.

9. A method for optimizing a definition for a database, comprising:
   receiving an input command to create a database object;
   receiving at least one extension corresponding to an estimated feature of the database;
   submitting the input command and the at least one extension to a knowledge base to determine an optimized command;
   wherein the knowledge base includes design information corresponding to how a database software product processes and stores information in the database;
   automatically determining that the input command is not optimal for use with the database software product;
   automatically determining the optimized command for use with the database software product; and
   automatically generating the optimized command by altering the input command;
   wherein the input and optimized command each comprise one or more data definition language (DDL) statements;
   wherein the optimized command alters the input command to result in one or more modifications to a DDL statement to conform the DDL statement to the database software product associated with the knowledge base; and
   wherein the steps of the method are performed by a computer system comprising a memory and at least one processor coupled to the memory.

10. The method according to claim 9, wherein the at least one extension is included in data definition language (DDL).

11. The method according to claim 9, wherein the estimated feature of the database includes at least one of a usage estimate, a growth estimate and a size estimate.

12. The method according to claim 9, wherein the estimated feature of the database includes at least one of an update frequency of a column, an update frequency of a row, a size of a data type, an average size of a column, an average size of a row and a growth rate of a table.

13. The method according to claim 9, further comprising automatically executing the optimized command against the database.

14. The method according to claim 9, further comprising outputting syntax of the optimized command to a user.

15. The method according to claim 9, wherein the knowledge base comprises a repository of decision trees and information about database objects to generate optimized create and alter commands.

16. The method according to claim 9, wherein the optimized command results in at least one of reordering table columns, adding an index and resizing database tablespace.

17. A computer program product for optimizing a definition for a database, the computer program product comprising a computer readable storage medium having program instructions embodied therewith, the program instructions executable by a processor to cause the processor to perform a method comprising:
   receiving an input command to create a database object;
   receiving at least one extension corresponding to an estimated feature of the database;
   submitting the input command and the at least one extension to a knowledge base to determine an optimized command;
   wherein the knowledge base includes design information corresponding to how a database software product processes and stores information in the database;
   automatically determining that the input command is not optimal for use with the database software product;

automatically determining the optimized command for use with the database software product; and automatically generating the optimized command by altering the input command;

wherein the input and optimized command each comprise one or more data definition language (DDL) statements; and wherein the optimized command alters the input command to result in one or more modifications to a DDL statement to conform the DDL statement to the database software product associated with the knowledge base.

* * * * *